United States Patent
Xu et al.

(10) Patent No.: US 10,534,186 B2
(45) Date of Patent: Jan. 14, 2020

(54) LENS STRIP, LED WALL WASHER WITH LENS STRIP

(71) Applicants: Self Electronics Co., Ltd., Ningbo, Zhejiang (CN); Wanjiong Lin, Ningbo, Zhejiang (CN); Self electronics USA Corporation, Norcross, GA (US)

(72) Inventors: Bozhang Xu, Zhejiang (CN); Haitao Wu, Zhejiang (CN); Fawei Zhang, Zhejiang (CN)

(73) Assignee: Self Electronics Co., Ltd., Ningbo (CN)

( * ) Notice: Subject to any disclaimer, the term of this patent is extended or adjusted under 35 U.S.C. 154(b) by 1 day.

(21) Appl. No.: 16/142,768

(22) Filed: Sep. 26, 2018

(65) Prior Publication Data

US 2019/0094557 A1    Mar. 28, 2019

(30) Foreign Application Priority Data

Sep. 28, 2017   (CN) .......................... 2017 1 0898420

(51) Int. Cl.
| | |
|---|---|
| *G02B 27/09* | (2006.01) |
| *F21V 19/00* | (2006.01) |
| *F21V 13/04* | (2006.01) |
| *G02B 5/20* | (2006.01) |
| *F21V 21/02* | (2006.01) |
| *G02B 5/00* | (2006.01) |
| *F21V 13/14* | (2006.01) |
| *G02B 19/00* | (2006.01) |

(Continued)

(52) U.S. Cl.
CPC ............ *G02B 27/0961* (2013.01); *F21V 5/02* (2013.01); *F21V 5/08* (2013.01); *F21V 7/0091* (2013.01); *F21V 13/04* (2013.01); *F21V 13/14* (2013.01); *F21V 19/0015* (2013.01); *F21V 21/02* (2013.01); *G02B 5/003* (2013.01); *G02B 5/20* (2013.01); *G02B 19/0028* (2013.01); *G02B 19/0066* (2013.01); *F21Y 2103/10* (2016.08)

(58) Field of Classification Search
CPC ................ G02B 27/0961; G02B 5/003; G02B 19/0028; G02B 19/0066; F21V 5/02; F21V 5/08; F21V 7/0091; F21V 13/04; F21V 13/14; F21V 19/0015; F21V 21/02; F21Y 2103/10
See application file for complete search history.

(56) References Cited

U.S. PATENT DOCUMENTS

| | | | | |
|---|---|---|---|---|
| 10,156,328 B2 * | 12/2018 | Xu | .......................... | F21V 29/89 |
| 2013/0003363 A1 * | 1/2013 | Lu | ...................... | G02B 19/0066 |
| | | | | 362/217.02 |

(Continued)

*Primary Examiner* — Mary Ellen Bowman
(74) *Attorney, Agent, or Firm* — Wang Law Firm, Inc.

(57) ABSTRACT

A lens strip, LED wall washer with lens strip and illumination system. In a section perpendicular to an extending direction of the lens strip, the lens strip comprises an optical axis, a light-emitting surface intersecting the optical axis, and a light source setting hole disposed on the optical axis, and first and second total reflection surfaces respectively disposed on opposite sides of the light source setting hole and located between the light source setting hole and the light-emitting surface, the illumination system can obtain a uniform and wider illumination of the entire illuminated surface 200, thereby it can form a perfect lighting effect, which can increase the user experience.

16 Claims, 3 Drawing Sheets

(51) Int. Cl.
  *F21V 5/08*      (2006.01)
  *F21V 5/02*      (2006.01)
  *F21V 7/00*      (2006.01)
  *F21Y 103/10*    (2016.01)

(56) References Cited

U.S. PATENT DOCUMENTS

| | | | |
|---|---|---|---|
| 2014/0071692 A1* | 3/2014 | Zhang | G02B 19/0028 |
| | | | 362/309 |
| 2014/0071693 A1* | 3/2014 | Zhang | G02B 19/0028 |
| | | | 362/309 |
| 2014/0071694 A1* | 3/2014 | Zhang | F21V 5/04 |
| | | | 362/309 |
| 2014/0160731 A1* | 6/2014 | Ye | F21V 31/005 |
| | | | 362/92 |
| 2014/0160766 A1* | 6/2014 | Chinniah | F21V 7/0091 |
| | | | 362/308 |
| 2015/0247622 A1* | 9/2015 | Zhang | F21V 13/04 |
| | | | 362/147 |
| 2016/0281956 A1* | 9/2016 | Ji | F21V 5/007 |
| 2019/0011110 A1* | 1/2019 | Kim | F21V 5/04 |

* cited by examiner

LENS STRIP, LED WALL WASHER WITH LENS STRIP

CROSS-REFERENCE TO A RELATED APPLICATION

This application claims priority to a Chinese Patent Application No. CN 201710898420.X, filed on Sep. 28, 2017.

FIELD OF THE TECHNOLOGY

The present invention relates to lighting field, with particular emphasis on a lens strip, LED wall washer with lens strip and illumination system.

BACKGROUND

In general daily life, various lighting devices can be seen everywhere, such as fluorescent lamps, street lamps, table lamps, art lamps, and the like. In the above lighting apparatus, a tungsten filament bulb is conventionally used as a light source. In recent years, due to the rapid development of technology, light-emitting diodes (LEDs) have been used as sources of illumination. In addition, in addition to lighting equipment, for general traffic signs, billboards, lights, etc., also use LEDs as a light source. As described above, the light-emitting diode as a light-emitting source is power-saving and with greater brightness, and it has been gradually standardized in use.

With the popularity of LED lamps, more and more occasions have begun to use LED lamps. In some areas of accent lighting, the lighting range of LED luminaires often needs to be adjusted according to actual needs. For example, in some wall washers, there are often disadvantages such as being bright in the vertical direction near the lamp and dark in the farther place away from the lamp, or the lighting range is too small in the horizontal direction due to the illuminance being too concentrated.

SUMMARY OF THE INVENTION

Therefore, the present invention provides a lens strip, LED wall washer with lens strip and illumination system that is capable of uniformizing brightness in an irradiation range and expanding the irradiation range to solve the above problem.

A lens strip, in a section perpendicular to an extending direction of the lens strip, the lens strip comprises an optical axis, a light-emitting surface intersecting the optical axis, and a light source setting hole disposed on the optical axis, and first and second total reflection surfaces respectively disposed on opposite sides of the light source setting hole and located between the light source setting hole and the light-emitting surface, on a section perpendicular to the extending direction of the lens strip the light source setting hole includes a wedge-shaped structure in which a surface of the light source setting hole intersecting the optical axis is an arcuate surface, and the light exiting surface includes a converging curved surface receiving the outgoing light of the first total reflection surface in a cross section perpendicular to an extending direction of the lens strip, a first inclined surface receiving the outgoing light of the curved surface of the light source setting hole, and a second inclined surface receiving the outgoing light of the second total reflection surface, the converging curved surface emitting the emitted light of the first total reflection surface after convergence, and in a cross section perpendicular to the extending direction of the lens strip, the angle between any point on the second inclined surface and the optical axis in the light-emitting direction is an acute Angle, the angle between the first inclined surface and the second inclined surface is an obtuse angle in a cross section perpendicular to the extending direction of the lens strip.

Advantageously, the light source setting hole of wedge-shaped structure comprises a top portion, a short side wall on one side of the top portion, and a long side wall on another side of the top portion.

Advantageously, the surface intersecting the top portion and the optical axis is the curved surface, and the curvature of the curved surface is a positive curvature with respect to the light exiting direction of the lens strip.

Advantageously, the first total reflection surface receives the outgoing light of the short side wall, and the second total reflection surface receives the outgoing light of the long side wall.

Advantageously, the second inclined surface is provided with a plurality of curved strips arranged end to end, and the extending direction of the curved strip is perpendicular to the extending direction of the lens strip.

An LED wall washer with a lens strip comprises a lens strip as described above, and a lampshade disposed in a light-emitting direction of the lens strip, the lampshade including a light-emitting hole in a section perpendicular to an extending direction of the lens strip, a reflecting edge on one side of the light-emitting hole, and a supporting edge on the other side of the light-emitting hole, a light-emitting surface of the lens strip is embedded in the light-emitting hole, and the second inclined surface and the reflecting edge are located on the same side of the optical axis in a cross section perpendicular to an extending direction of the lens strip, and the converging curved surface and the supporting edge are located on the same side of the optical axis, and the reflecting edge is configured to reflect a portion of the outgoing light of the first inclined surface, the supporting edge and the outgoing light of the light emitting surface is interval.

Advantageously, the LED wall washer with a lens strip further comprises a light emitting module, the lens strip is disposed in a light emitting direction of the light emitting module, the light emitting module includes at least one LED chip, and an optical axis of the lens strip the chip optical axis of LED chip is coincidence.

Advantageously, the LED wall washer further comprises a optical filter disposed on the lampshade, one side of the optical filter is disposed on the support edge and receives the outgoing light of the lens strip, the other side of the optical filter abuts against the reflecting edge and receives the outgoing light of the reflecting edge, and the optical filter is fixed on the supporting edge so that the optical filter is attached to the supporting edge.

An illumination system comprises an LED wall washer with a lens strip as described above, and an illuminated surface illuminated by an LED wall washer with a lens strip, an angle between the optical axis and the illuminated surface includes an acute angle, the acute angle is between 5 degrees and 10 degrees, and the lens strip extends in a direction parallel to the illuminated surface and the emitted light of the second inclined surface of the lens strip is directed toward one side of the illuminated surface close to the LED wall washer, and the emitted light of the converging curved surface of the lens strip is directed toward other side of the illuminated surface close to the LED wall washer.

Advantageously, the illuminated surface is perpendicular to the ground plane with reference to the ground plane, the lens strip extends parallel to the illuminated surface and the ground plane.

Compared with the prior art, due to the optical structural design of the lens strip 20 and the cooperation of the lampshade 30, the illumination system can obtain a uniform and wider illumination of the entire illuminated surface 200, thereby it can form a perfect lighting effect, which can increase the user experience.

DETAILED DESCRIPTION OF THE DRAWINGS

The drawings described herein are intended to promote a further understanding of the present invention, as follows.

DESCRIPTION OF THE PREFERRED EMBODIMENTS

The present application is illustrated by way of the following detailed description based on of the accompanying drawings. It should be noted that illustration to the embodiment in this application is not intended to limit the invention.

Figure 1:
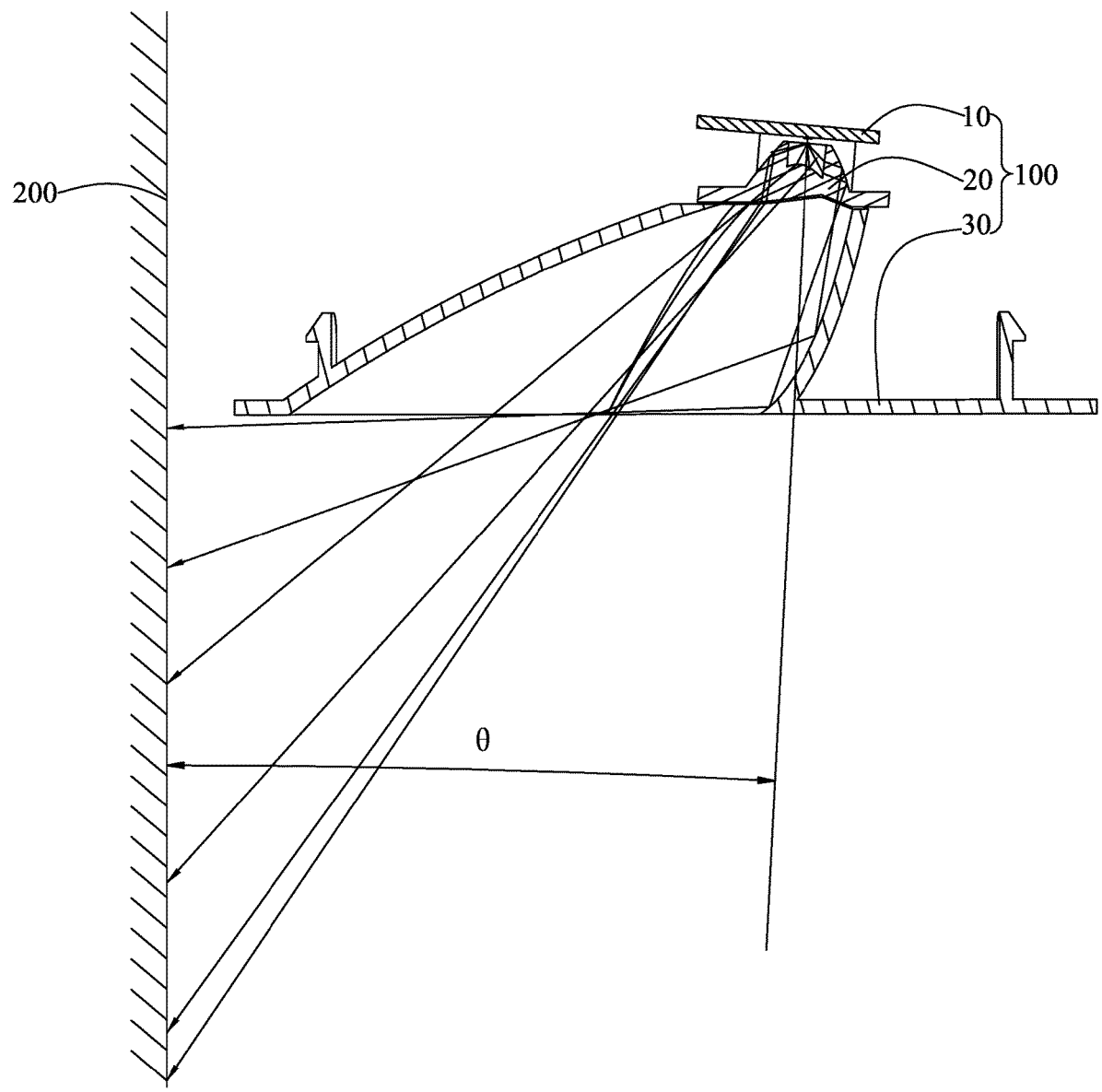
FIG. 1 is a schematic structural view and optical path diagram of an illumination system provided by the present invention.
Figure 2:
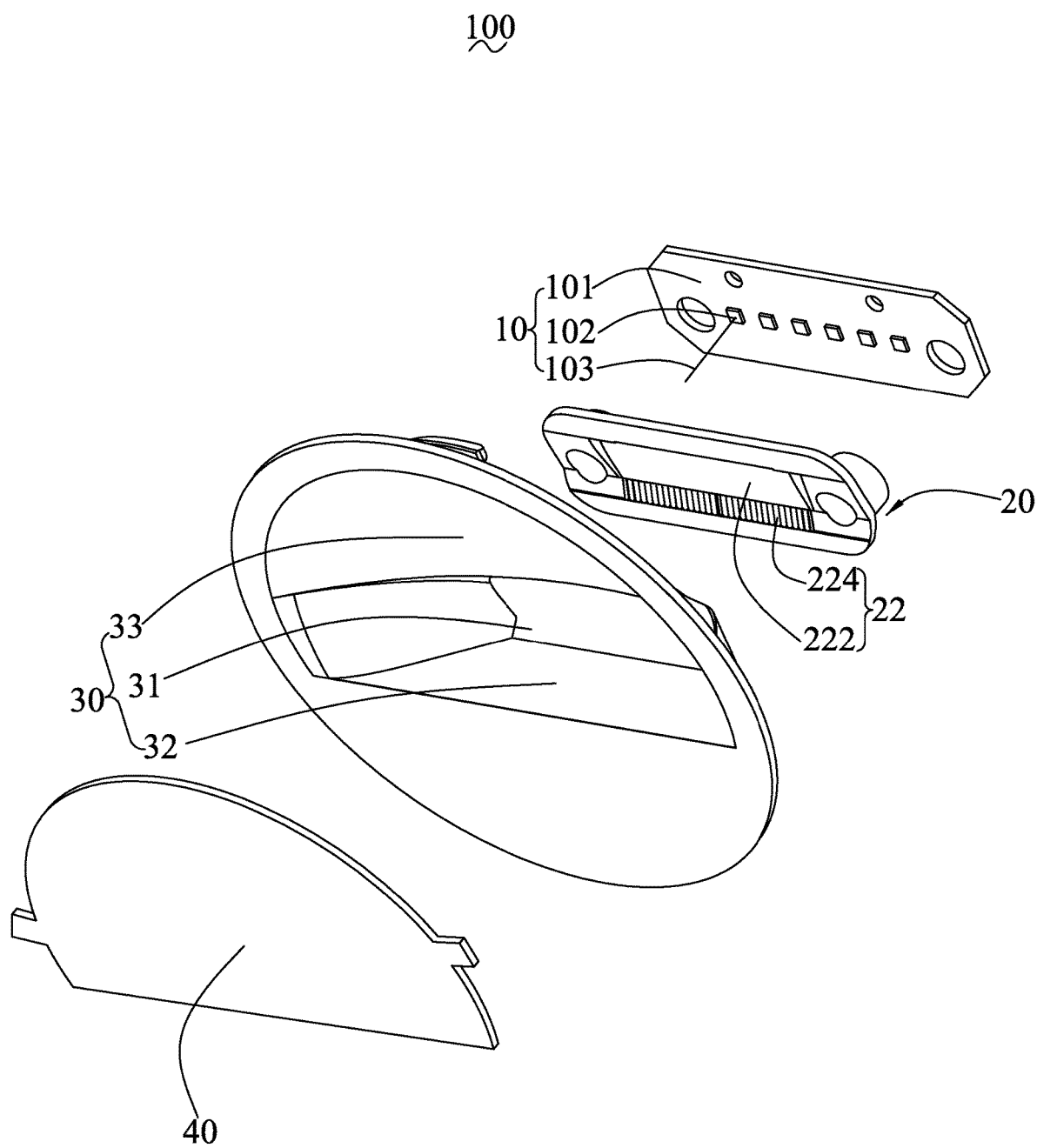
FIG. 2 is a schematic exploded view of an LED lamp with a lens strip comprised in the illumination system of FIG. 1.
Figure 3:
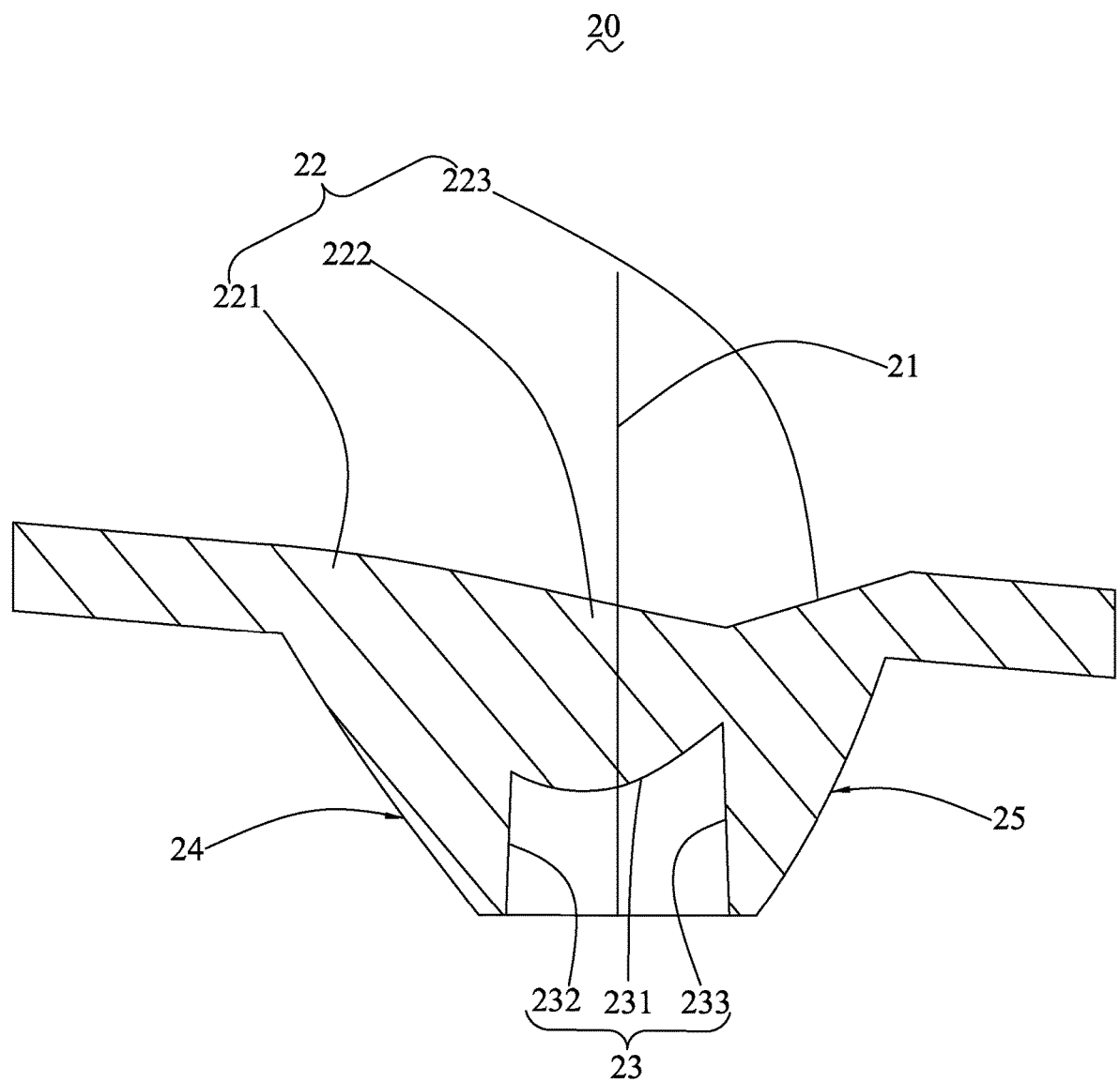
FIG. 3 is a cross-sectional structural view of a lens strip comprised in the LED lamp with a lens strip of FIG. 2.

Please refer to FIG. 1 and FIG. 3, which are schematic structural diagrams of an illumination system provided by the present invention. The illumination system comprises an LED wall washer 100 with a lens strip, and an illuminated surface 200 illuminated by an LED wall washer 100 with a lens strip. In practical applications, the LED wall washer 100 with a lens strip may be multiple, it may be determined according to the size or the number of the illuminated surface 200. In the present embodiment, only the present invention is described in detail, so only one LED wall washer 100 with a lens strip and an illuminated surface 200 corresponding to the LED wall washer 100 with the lens strip are shown. It is conceivable that the illumination system further comprises other components, such as a cabinet, components for setting the ceiling, socket, track, etc. of the LED wall washer 100 with the lens strip, and for providing the lens strip with the lens strip The LED wall washer 100 is powered by a power source, etc., because components such as these are not the focus of the present invention and will not be described herein.

The LED wall washer 100 with a lens strip comprises a light emitting module 10, a lens strip 20 disposed in a light emitting direction of the light emitting module 10, a lampshade 30 disposed in a light emitting direction of the lens strip 20, and a optical filter 40 disposed on the lampshade 30. As a light fixture, the LED wall washer 100 with a lens strip should also comprise other functional modules, such as a light stand, a snap assembly for mounting the LED wall washer 100, a wire plug assembly for providing power, and power components and the like, which are well known to those skilled in the art, will not be described in detail herein.

The light emitting module 10 comprises a circuit board 101 and at least one LED chip 102 disposed on the circuit board 101. The circuit board 101 can be a printed circuit board that is used to provide compliant power to the LED chip 102. It is conceivable that electronic components such as diodes and transistors are electrically connected to the circuit board 101 to convert the commercial power into a voltage or current suitable for the operation of the LED chip 102. The number of the LED chip 102 depends on actual needs, such as the size of the light lumens. In the present embodiment, in order to explain the present invention, the light emitting module 10 has a row of chipsets composed of six LED chips 102. The LED (Light Emitting Diode) chip 102 is a solid-state semiconductor device capable of converting electrical energy into visible light, which can directly convert electricity into light energy, which is also a prior art. The light emitting module 10 further comprises a chip optical axis 103. It is well known that each LED chip 102 has a chip optical axis that is optically oriented, i.e., the optical design should be referenced to the optical axis. Therefore, the optical axis of the chip of each of the LED chip 102 is the chip optical axis 103 of the light emitting module 10. It is conceivable that in the embodiment, the chip optical axis 103 of the light emitting module 10 is multiple and forms a row.

The lens strip 20 is made of an optical grade material, such as an acrylic material, and has a strip shape as a whole. Therefore, the structure and optical principle of the lens strip 20 will be more described in a cross section perpendicular to the extending direction of the lens strip 20. In a section perpendicular to the extending direction of the lens strip 20, the lens strip 20 comprises an optical axis 21, a light-emitting surface 22 intersecting the optical axis 21, and a light source setting hole disposed on the optical axis 21, and first and second total reflection surfaces 24, 25 respectively disposed on both sides of the light source setting hole 23 and located between the light source setting hole 23 and the light-emitting surface 22. It is of course conceivable that the lens strip 20 further comprises another accessory structure such as a mounting structure.

The optical axis 21 coincides with the chip optical axis 103 of the LED chip 102 and has the same function and design principle as the chip optical axis 103, that is, it also guides the lens strip 20 during optical design, that is, In the optical design, the optical axis 21 should be referred to.

The light-emitting surface 22 is a boundary surface of the lens strip 20, that is, all light should be emitted from the light-emitting surface 22, which serves as a design reference for the lampshade 30. In order to achieve the above effect, the light-emitting surface 22 comprises a converging curved surface 221 that receives the outgoing light of the first total reflection surface 24 in a cross section perpendicular to the extending direction of the lens strip 20, a first inclined surface 222 receiving the outgoing light emitted from the curved surface of the light source setting hole 23 and a second inclined surface 223 receiving the outgoing light of the second total reflection surface 24. The converging curved surface 221 converges the emitted light of the first total reflection surface 24 and emits the light. An angle between the arbitrary point on the second inclined surface 223 and the optical axis 21 in the light exiting direction is an acute angle in a cross section perpendicular to the extending direction of the lens strip 20. An angle between the first inclined surface 222 and the second inclined surface 223 is an obtuse angle in a section perpendicular to the extending direction of the lens strip 20. The cross-sectional shape of the light-emitting surface 22 determines the light-emitting direction of the lens strip 20. In actual use, the light emitted from the converging curved surface 221 needs to be directed toward the illuminated surface 200 far from the LED wall washer 100. Therefore, the converging curved surface 221 converges the outgoing light to compensate for the loss due to the long distance. The emitting direction of the second inclined surface 223 is the illuminated surface 200 closest to the LED wall washer 100. In practical applications, the emitting surface of the LED wall washer 100 is almost perpendicular to the illuminated surface 200, and therefore, An angle between any point on the second inclined surface 223 and the optical axis 21 in the light-emitting direction is an acute angle to direct light to a range of a surface perpendicular to the illuminated surface 200 of the LED wall washer 100. The outgoing light of the first inclined surface 222 will be directed between the range illuminated by the converging curved surface 221 and the second inclined surface 223, and to connect the converging curved surface 221 and the second inclined surface 223, the angle between the first inclined surface 222 and the second inclined surface 223 should be an obtuse angle. In order to enlarge the illumination range of the second inclined surface along the extending direction of the lens strip 20, the second inclined surface 223 is further provided with a plurality of curved strips 224 arranged end to end, and the extending direction of the curved strips 224 is perpendicular to the extending direction of the lens strip 20.

The light source setting hole 23 is used to set the LED chip 102, which should be in a trough shape to provide a row of LED chip 102. The light source setting hole 23 is a rectangular hole in which a central axis coincides with the optical axis 21 in a section perpendicular to the optical axis 21. The light source setting hole 23 comprises a top portion 231, a short side wall 232 on one side of the top portion 231, and a long side wall 233 on another side of the top portion 231 in a section perpendicular to the extending direction of the lens strip 20. The light source setting hole 23 comprises a wedge-shaped structure for the reason of the long and short side walls 233, 232. The top portion 231 intersects the optical axis 21, i.e., the surface in the wedge-shaped structure where the light source setting hole 23 intersect with the optical axis 21, and the top portion 231 is a curved surface. And the curvature of the curved surface is a positive curvature with respect to the light emitting direction of the lens strip. The first total reflection surface 24 receives the outgoing light of the short side wall 232, and the second total reflection surface 25 receives the outgoing light of the long side wall 233. It is conceivable that the range of the outgoing light of the first inclined surface 222 is the largest, so that the light received from the top portion 231 is also the most.

The first and second total reflection surfaces 24 and 25 are an optical structure whose surface conforms to the law of total reflection, that is, all the light irradiated to the surface thereof is reflected, that is, the light reflected by the first total reflection surface 24 is directed to the converging curved surface 221, the light reflected by the second total reflection surface 25 is directed to the second inclined surface 223.

The lampshade 30 is disposed on the lamp holder and due to the lens strip 20, the structure and optical principle of the lampshade 30 will be more illustrative in terms of a section perpendicular to the direction in which the lens strip 20 extends. In a section perpendicular to the extending direction of the lens strip 20 the lampshade 30 comprises a light-emitting hole 31, a reflecting edge 32 on one side of the light-emitting hole 31, and a supporting edge 33 on the other side of the light-emitting hole 31. The light-emitting surface 22 of the lens strip 20 is embedded in the light-emitting hole 31. Therefore, the light-emitting hole 31 may be a rectangular shape or a mounting structure for the lens strip 20, and the light-emitting hole 31 may be other shape. In order not to block the lampshade 30 from the outgoing light of the light-emitting surface 22, the second inclined surface 223 and the reflecting edge 32 are located on the same side of the optical axis 21 in a cross section perpendicular to the extending direction of the lens strip 20, and the converging curved surface 221 and the supporting side 33 are located on the same side of the optical axis 21. As can be seen from the figure, the supporting edge 33 also has a beveled surface and has a certain arc shape, and the structural design is designed not to block the outgoing light of the converging curved surface 221 and the first inclined surface 222, and thus the supporting edge 33 is spaced apart from the outgoing light of the light-emitting surface 22. The reflecting edge 32 is configured to receive a portion of the emitted light of the second inclined surface 223, and direct a portion of the emitted light of the second inclined surface 223 to a position where the lampshade 30 and the illuminated surface 200 meet a boundary to achieve the purpose of all illuminated faces 200 is illuminated. The structure of the reflecting edge 32 will not be described in detail herein, but the lighting design is always required.

The optical filter 40 is disposed on the lampshade 30. One side of the optical filter 40 is disposed on the supporting edge 33 and receives the outgoing light of the lens strip 20, and the other side abuts against the reflective edge 32 and receives the outgoing light of the reflective edge 32. The optical filter 40 is a prior art with a light transmittance of less than one, and the purpose is to filter out or block some stray light. The optical filter 40 is fixed on the supporting edge 33 so that the optical filter 40 can be attached to the supporting edge 33 to filter or block some stray light as much as possible, so that the LED is washed. The light output of the LED wall washer 100 is better, that is, the yellow edge is reduced, etc.

The illuminated surface 200 is a position where the LED wall washer 100 with the lens strip is illuminated, and it may be a flat surface or a curved surface. In the present embodiment, the present invention is merely exemplified, and the illuminated surface 200 is a flat surface. The illuminated surface 200 may be an item such as a picture to be illuminated in a museum, or may be a merchandise in a window in a shopping mall. For the sake of simplicity, the illuminated surface 200 is perpendicular to the ground plane with reference to the ground plane. When the LED wall washer 100 is actually mounted, the lens strip 20 should extend parallel to the illuminated surface 200 and the ground plane. The LED wall washer 100 with a lens strip is generally used in the field of, for example, a wall washer, and is not used in the field of accent lighting. Therefore, the angle between the chip optical axis 103 of the light emitting module 10 of the LED wall washer 100 with the lens strip and the illuminated surface 200 should comprise an acute angle θ, and the acute angle θ is between 5 and 10 degrees. When the LED wall washer 100 with the lens strip is mounted, the outgoing light of the second inclined surface 223 of the lens strip 20 should be directed toward the side of the illuminated surface adjacent to the LED wall washer 100. The emitted light of the converging curved surface 221 of the lens strip 20 is directed toward the side of the illuminated surface 200 away from the LED wall washer 100. As described above, the first inclined surface 222 will illuminate in the middle of the illuminated surface 200.

The optical effect of the LED wall washer 100 with the lens strip will be described below with an application example in which the extending direction of the lens strip 20 is parallel to the illuminated surface 200 and the ground plane. The converging curved surface 221 is directed toward the illuminated surface 200 far from the LED wall washer 100, and because of its polymerization effect on the light, it can compensate for more attenuation due to reaching farther from the LED wall washer 100. that is, the side of the illuminated surface 200 that is far from the LED wall washer 100 and the side of the illuminated surface 200 that is closer to the LED wall washer 100, within the same illumination area, the side of the illuminated surface 200 that is far from the LED wall washer 100 obtains more light than the side of the illuminated surface 200 that is closer to the LED wall washer 100, so that more light can be obtained to compensate for the greater attenuation due to reaching farther from the LED wall washer 100. The top portion 231 of the light source setting hole 23 is a curved surface, so that it has a certain divergence effect, and therefore, although the light received by the LED chip 102 is the light with the highest light intensity, it can be appropriately weakened the intensity when the illuminated surface 200 is irradiated due to its divergence such that the illuminance of other irradiation regions is uniform. The second inclined surface 223 and the cooperation of the reflecting edge 32 can illuminate the junction and the vicinity of the LED wall washer 100 and the illuminated surface 200. Thereby, the purpose of illuminating the entire illuminated surface 200 is achieved, and at the same time, the illumination in which is closer to the LED wall washer 100 or farther away from the LED wall washer 100 can be made substantially. Here, it is necessary to explain the meaning of "substantially the same", which means that although the illuminance meter is used to measure both sides of the illuminated surface 200 farther or closer to the LED wall washer 100, the illuminance values may not be exactly the same. However, it is difficult for human eyes to observe this difference, so that the illumination effect of the illuminated surface 200 is consistent for people's vision.

Compared with the prior art, due to the optical structural design of the lens strip 20 and the cooperation of the lampshade 30, the illumination system can obtain a uniform and wider illumination of the entire illuminated surface 200, thereby it can form a perfect lighting effect, which can increase the user experience.

The above disclosure has been described by way of example and in terms of exemplary embodiment, and it is to be understood that the disclosure is not limited thereto. Rather, any modifications, equivalent alternatives or improvement etc. within the spirit of the invention are encompassed within the scope of the invention as set forth in the appended claims.

The invention claimed is:

1. A lens strip, characterized in that: in a section perpendicular to an extending direction of the lens strip, the lens strip comprises an optical axis, a light-emitting surface intersecting the optical axis, and a light source setting hole disposed on the optical axis, and first and second total reflection surfaces respectively disposed on opposite sides of the light source setting hole and located between the light source setting hole and the light-emitting surface, on a section perpendicular to the extending direction of the lens strip the light source setting hole includes a wedge-shaped structure in which a surface of the light source setting hole intersecting the optical axis is an arcuate surface, and the light exiting surface includes a converging curved surface receiving the outgoing light of the first total reflection surface in a cross section perpendicular to an extending direction of the lens strip, a first inclined surface receiving the outgoing light of the curved surface of the light source setting hole, and a second inclined surface receiving the outgoing light of the second total reflection surface, the converging curved surface emitting the emitted light of the first total reflection surface after convergence, and in a cross section perpendicular to the extending direction of the lens strip, the angle between any point on the second inclined surface and the optical axis in the light-emitting direction is an acute Angle, the angle between the first inclined surface and the second inclined surface is an obtuse angle in a cross section perpendicular to the extending direction of the lens strip.

2. The lens strip as claimed in claim 1, wherein the light source setting hole of wedge-shaped structure comprises a top portion, a short side wall on one side of the top portion, and a long side wall on another side of the top portion.

3. The lens strip as claimed in claim 2, wherein the surface intersecting the top portion and the optical axis is the curved surface, and the curvature of the curved surface is a positive curvature with respect to the light exiting direction of the lens strip.

4. The lens strip as claimed in claim 2, wherein the first total reflection surface receives the outgoing light of the short side wall, and the second total reflection surface receives the outgoing light of the long side wall.

5. The lens strip as claimed in claim 1, wherein the second inclined surface is provided with a plurality of curved strips arranged end to end, and the extending direction of the curved strip is perpendicular to the extending direction of the lens strip.

6. An LED wall washer with a lens strip, characterized in that: the LED wall washer with a lens strip comprises a lens strip according to claim 1, and a lampshade disposed in a light-emitting direction of the lens strip, the lampshade including a light-emitting hole in a section perpendicular to an extending direction of the lens strip, a reflecting edge on one side of the light-emitting hole, and a supporting edge on the other side of the light-emitting hole, a light-emitting surface of the lens strip is embedded in the light-emitting hole, and the second inclined surface and the reflecting edge are located on the same side of the optical axis in a cross section perpendicular to an extending direction of the lens strip, and the converging curved surface and the supporting edge are located on the same side of the optical axis, and the reflecting edge is configured to reflect a portion of the outgoing light of the first inclined surface, the supporting edge and the outgoing light of the light emitting surface is interval.

7. An LED wall washer with a lens strip as claimed in claim 6, wherein the light source setting hole of wedge-shaped structure comprises a top portion, a short side wall on one side of the top portion, and a long side wall on another side of the top portion.

8. An LED wall washer with a lens strip as claimed in claim 6, wherein the surface intersecting the top portion and the optical axis is the curved surface, and the curvature of the curved surface is a positive curvature with respect to the light exiting direction of the lens strip.

9. An illumination system, characterized in that: the illumination system comprises an LED wall washer with a lens strip according to claim 6, and an illuminated surface illuminated by an LED wall washer with a lens strip, an angle between the optical axis and the illuminated surface includes an acute angle, the acute angle is between 5 degrees and 10 degrees, and the lens strip extends in a direction parallel to the illuminated surface and the emitted light of the second inclined surface of the lens strip is directed toward one side of the illuminated surface close to the LED wall washer, and the emitted light of the converging curved surface of the lens strip is directed toward other side of the illuminated surface close to the LED wall washer.

10. The illumination system as claimed in claim 9, wherein the illuminated surface is perpendicular to the ground plane with reference to the ground plane, the lens strip extends parallel to the illuminated surface and the ground plane.

11. An LED wall washer with a lens strip as claimed in claim 6, wherein the first total reflection surface receives the outgoing light of the short side wall, and the second total reflection surface receives the outgoing light of the long side wall.

12. An LED wall washer with a lens strip as claimed in claim 6, wherein the second inclined surface is provided with a plurality of curved strips arranged end to end, and the extending direction of the curved strip is perpendicular to the extending direction of the lens strip.

13. The LED wall washer with a lens strip as claimed in claim 6, wherein the LED wall washer with a lens strip further comprises a light emitting module, the lens strip is disposed in a light emitting direction of the light emitting module, the light emitting module includes at least one LED chip, and an optical axis of the lens strip the chip optical axis of LED chip is coincidence.

14. The LED wall washer with a lens strip as claimed in claim 6, wherein the LED wall washer further comprises a optical filter disposed on the lampshade, one side of the optical filter is disposed on the support edge and receives the outgoing light of the lens strip, the other side of the optical filter abuts against the reflecting edge and receives the outgoing light of the reflecting edge, and the optical filter is fixed on the supporting edge so that the optical filter is attached to the supporting edge.

15. The LED wall washer with a lens strip as claimed in claim 8, wherein the LED wall washer further comprises a optical filter disposed on the lampshade, one side of the optical filter is disposed on the support edge and receives the outgoing light of the lens strip, the other side of the optical filter abuts against the reflecting edge and receives the outgoing light of the reflecting edge, and the optical filter is fixed on the supporting edge so that the optical filter is attached to the supporting edge.

16. The LED wall washer with a lens strip as claimed in claim 12, wherein the LED wall washer further comprises a optical filter disposed on the lampshade, one side of the optical filter is disposed on the support edge and receives the outgoing light of the lens strip, the other side of the optical filter abuts against the reflecting edge and receives the outgoing light of the reflecting edge, and the optical filter is fixed on the supporting edge so that the optical filter is attached to the supporting edge.

* * * * *